United States Patent [19]
Kesterson et al.

[11] 3,844,475
[45] Oct. 29, 1974

[54] ENVIRONMENTAL CONDITION CONTROL

[75] Inventors: Albert O. Kesterson; Frederick N. Lancia, both of Columbus; Ralph C. Liebert, Worthington, all of Ohio

[73] Assignee: Liebert Corp., Columbus, Ohio

[22] Filed: Apr. 20, 1972

[21] Appl. No.: 245,789

[52] U.S. Cl. ............... 236/1 E, 165/26, 307/252 B, 307/252 K
[51] Int. Cl. .......................................... G05b 11/18
[58] Field of Search.......... 236/1 E; 165/26; 307/39, 307/252 K, 311, 235, 252 B

[56] References Cited
UNITED STATES PATENTS

| | | | |
|---|---|---|---|
| 3,231,802 | 1/1966 | Myers | 318/29 |
| 3,377,547 | 4/1968 | Ohlson | 323/100 |
| 3,454,078 | 7/1969 | Elwart | 236/78 X |
| 3,623,545 | 11/1971 | Pinckaers | 236/1 E |
| 3,670,180 | 6/1972 | Grossimon et al. | 307/252 K |
| 3,672,811 | 6/1972 | Hron | 307/252 B |
| 3,714,980 | 2/1973 | Lancia et al. | 165/11 |

*Primary Examiner*—William E. Wayner
*Attorney, Agent, or Firm*—Cennamo, Kremblas & Foster

[57] ABSTRACT

Temperature and/or humidity electrical/electronic controls to maintain a room at a constant temperature and humidity. The controls provide a step function to actuate one or more temperature and/or humidity conditioners in response to the degree of of change without hunting. No adjustments are required and each stage is an exact duplicate. A unique component, arrangement is utilized in a sensitiveity and dead band bridge control circuit.

9 Claims, 5 Drawing Figures

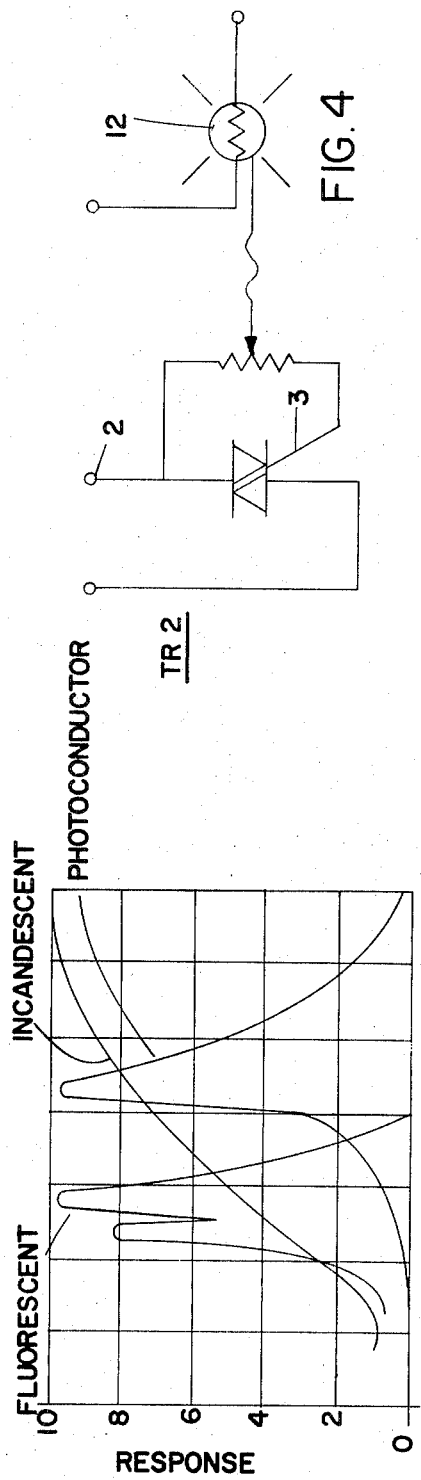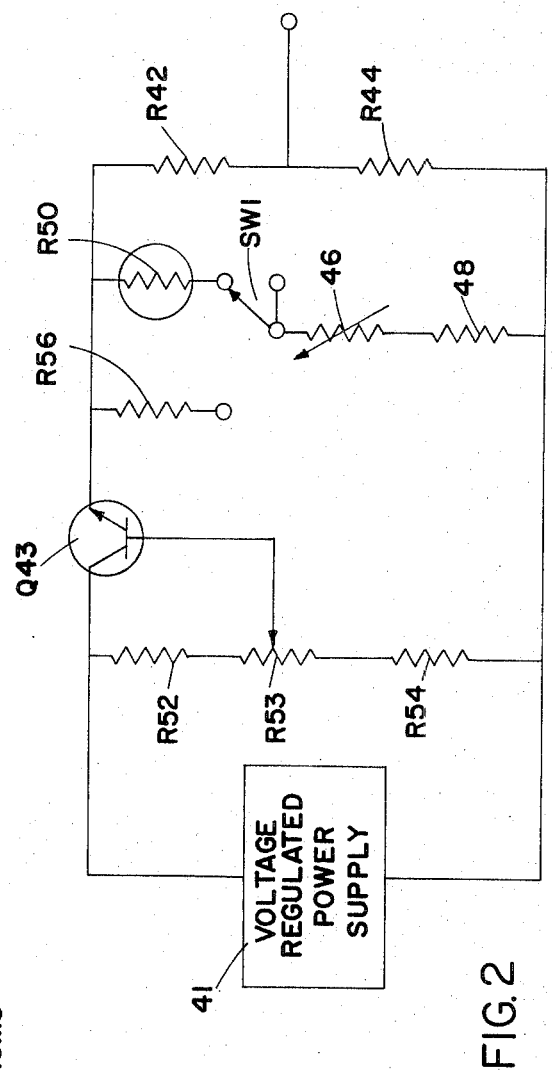

ENVIRONMENTAL CONDITION CONTROL

BACKGROUND OF THE INVENTION

The prior art is replete with temperature and humidity control circuits. There is also commercially available apparatus that combines the temperature and humidity functions. Each of the prior art devices, however, have many features that render them unsuitable for their intended purpose. In the first instance, the cost versus accuracy curve is out of proportion, that is, to obtain accuracy the cost is prohibitive; while on the other hand, low cost devices are so inaccurate that they are relatively useless.

In operation, it has been found that one of the serious electrical disadvantages of the prior art devices are their tendency to "hunt" about a set point. That is, at a given setting — whether it is temperature or humidity — the apparatus is on and off, back and forth. At times heating and cooling (or wetting and drying) are alternately turned on and off as the controls hunt.

A more significant electrical disadvantage is that heating-cooling or wetting-drying apparatus in major installations is large and expensive. Even in those installations where several pieces of apparatus are utilized, they are still large and expensive. In the prior art systems a slight deviation of the temperature or humidity from the set point causes the entire system to turn on.

Another disadvantage of the prior art devices is that each stage of temperature or humidity control must be calibrated in manufacturing and periodically recalibrated thereafter.

SUMMARY OF THE INVENTION

The present invention provides apparatus and system for maintaining a desired temperature and humidity without the above-noted disadvantages. Generally, to avoid the "hunting" of the system about the set point, the circuit of the present invention provides a dead band. That is, the deviation of the temperature or hunting must exceed a predetermined amount above or below the set point prior to actuation of the condition apparatus.

In a system configuration for a major installation the preferred embodiment includes a step function of control. A deviation beyond the predetermined amount will cause the actuation of only a first conditioning apparatus; deviation beyond a second predetermined amount causes the actuation of a second conditioning apparatus; deviation beyond a third predetermined amount causes the actuation of a third conditioning apparatus; and so on.

The electronic circuits for determining the above-noted set points and predetermined settings comprise solidstate circuitry of conventional and commercially available components of relatively low cost. The components are utilized in unique manner to maintain simplicity, accuracy, and continuous reliability without recalibration.

OBJECTS

It is accordingly an object of the present invention to provide a new and improved temperature and humidity control system for actuating conditioning apparatus.

It is a further object of the present invention to provide in an air conditioning system temperature and humidity actuating controls response beyond a predetermined amount above or below a set point to eliminate hunting.

It is another object of the present invention to provide an air conditioning system that is responsive in operational sequency in accordance with a step function related to the change.

It is another object of the present invention to provide a temperature and humidity control system that is made up of solidstate components without requirement of calibration.

Other objects and features of the present invention will become apparent from the following detailed description when taken in conjunction with the drawings.

BRIEF DESCRIPTION OF THE DRAWINGS

FIG. 2 is an abbreviated circuit schematic of the power supply utilized in the embodiment of FIG. 1;

FIG. 4 is a specific illustration of the triac circuit of FIG. 1; and

FIG. 5 is a graphical waveform of the photoconductor response.

DETAILED DESCRIPTION OF THE DRAWINGS

Figure 1:
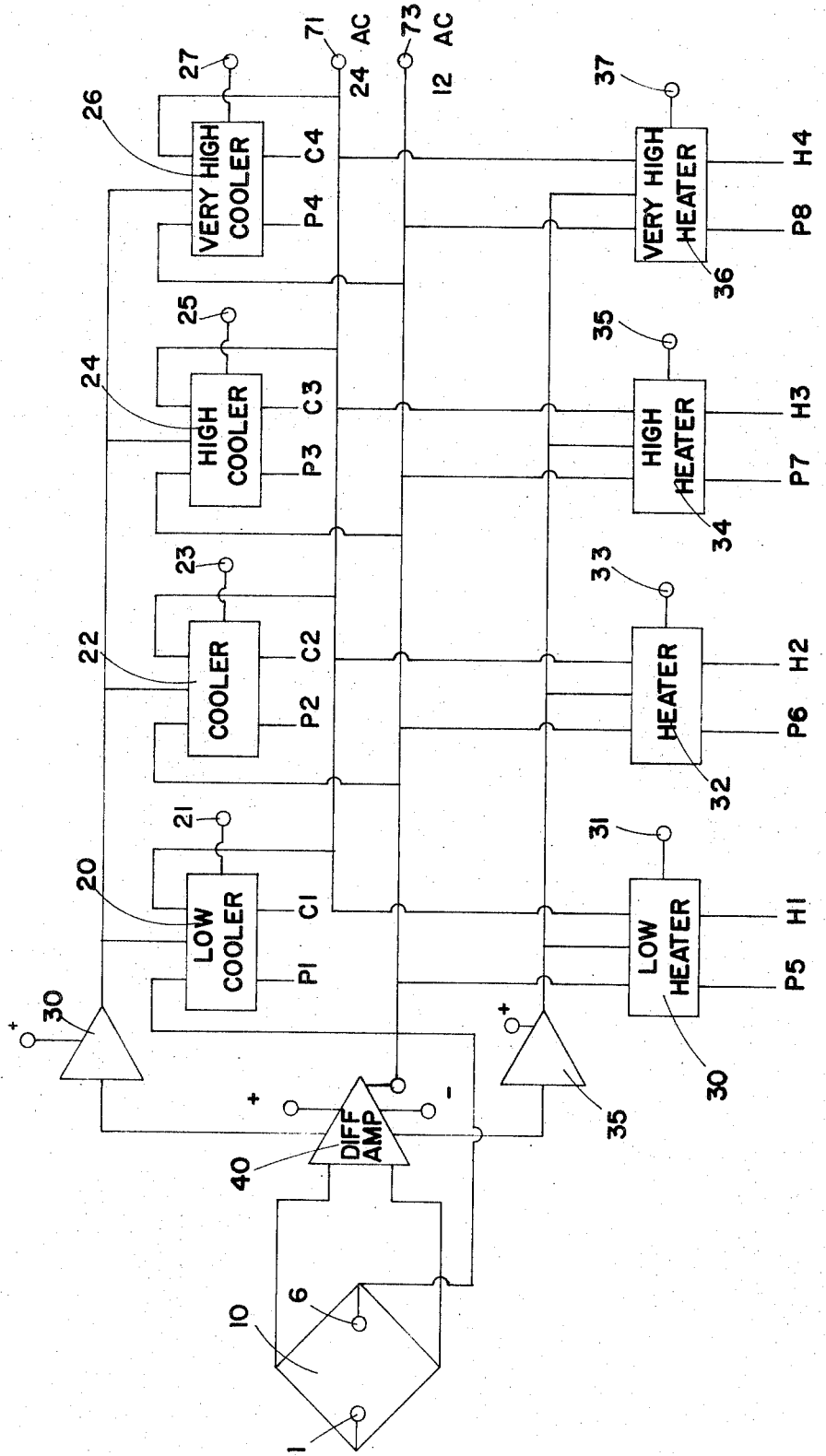
FIG. 1 is a fundamental circuit illustrating the general concepts of the present invention.

A heating/cooling and wetting/drying system utilizing the control circuit of the present invention is illustrated in FIG. 1. In the temperature control system, there are provided low 30, intermediate 32, high 34 and very high 36 stages of heater temperature control. There are also provided cooling temperature controls comprising a low 20, intermediate 22, high 24, and very high 26 cooling states. The temperature control circuits of FIG. 1 are basically those of FIG. 3, as described hereinafter. Pilot lights 31, 33, 35, and 37 correspond to the low, intermediate, high and very high heaters 30, 32, 34, and 36 respectively; whereas pilot lights 21, 23, 251 and 27 correspond to the low, intermediate, high and very high coolers 20, 22, 24, and 26 respectively.

Very generally, in operation of the temperature control system of FIG. 1, a low temperature sensed variation by bridge 10 will cause — actuation of the low heater 30. If the temperature variation falls below a second set point, the control circuit will actuate intermediate heater 32; and if the temperature falls below a third set point, the control circuit will cause the actuation of high heater 34 and then very high heater 36 and so on. The pilot lights 31, 33, 35, and 37 visually indicate whether one or all stages of its heaters have been actuated. Further, assuming that the temperature variation is sufficient to have caused each of the heaters 30, 32, 34, and 36 to be actuated, as the hot air from the heaters cause the temperature of the air to rise, the bridge 10 will sense this increase in temperature. The reverse swing of the sensor 10 will deactivate in reverse order the very high heater 36, the high heater 34, the intermediate heater 32, and finally the low heater 30. In this way, the very high heater 36 — the most costly to operate — will be on only a relatively short time of the heating cycle and in reverse order of time. On many occassions only the first heater 30 may be required.

If the temperature sensed by bridge 10 should show an increase, low cooler 20 will become actuated. Intermediate cooler 22 and high cooler 24 and then very high cooler 26 will become activated dependent upon whether the increase in temperature exceeds the second or third set point. Pilot lights 21, 23, 25, and 27 visually indicate which of the coolers are in operation.

Also, again, in a cooling situation assuming all four coolers have been activated, as the cool air from the cooler causes the temperature to drop, the bridge 10 will sense the drop. The reverse swing of the sensor 10 will deactivate in reverse order the very high cooler 26, the high cooler 24, intermediate cooler 22 and finally the low cooler 20. Again, as in the heating system, the very high cooler 26 will be in operation only for a relatively short duration of the cooling cycle and the time of operation is again in reverse order.

Figure 3:
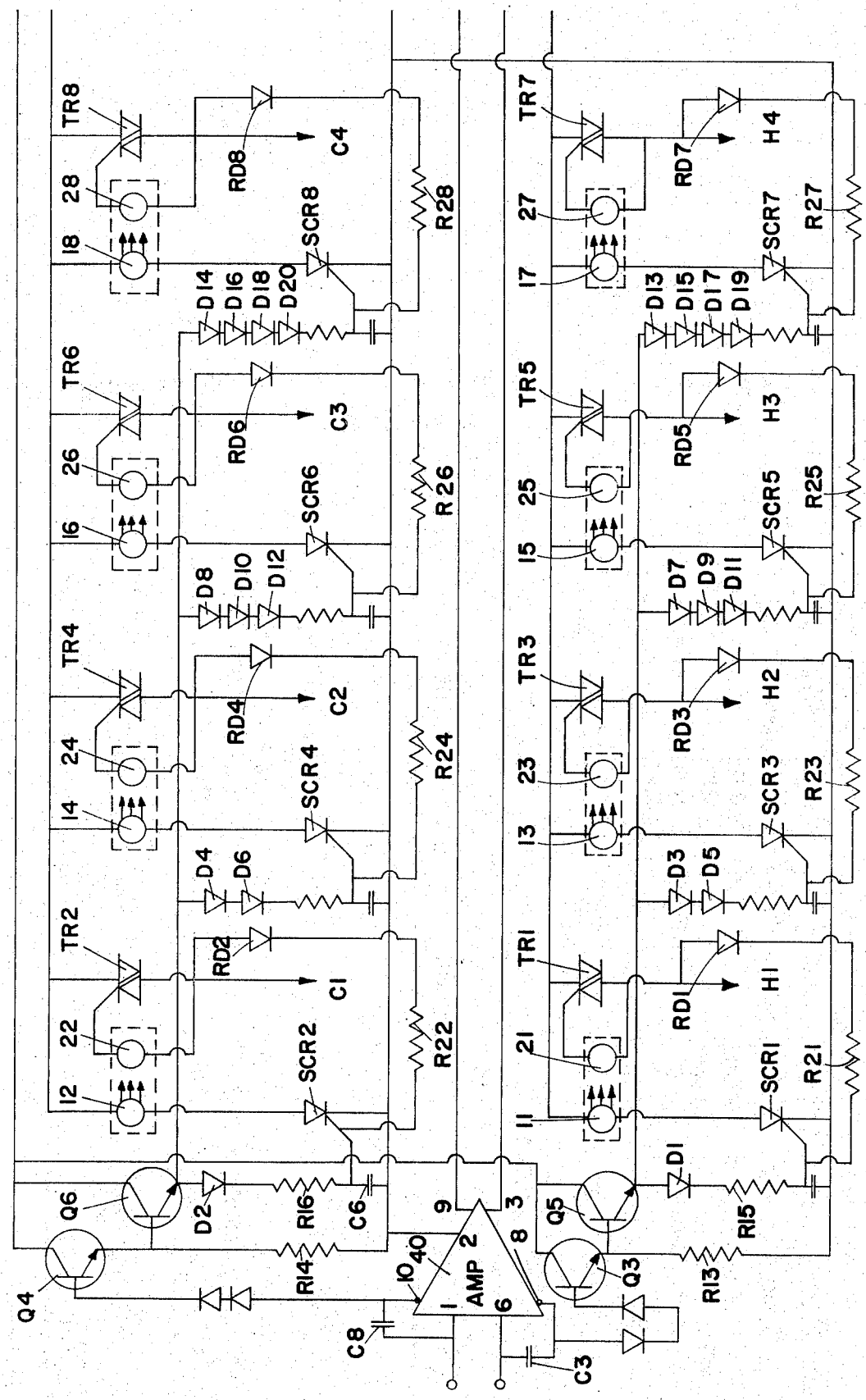
FIG. 3 is a detailed schematic circuit illustrating a preferred embodiment of the present invention.

The solidstate heating and cooling temperature control system is shown schematically in FIG. 3. The temperature control comprises 8 stages of step control — with 4 stages of heating control and 4 stages of cooling control.

The four stages driven from pin 8 of the differential amplifier 40 are the heating control states, and the four stages driven by pin 10 of the differential amplifier 40 are the cooling control stages.

Terminals 1 and 6 of the differential amplifier 40 are connected across a d-c bridge 10 that contains the temperature sensor described more fully hereinafter. In operation of the eight-stage controller of FIG. 3, changes in the bridge balance caused by temperature variation are amplified by the differential amplifier 40 and fed to the $Q_4 - Q_6$ transistor buffer amplifiers if the variation indicates the need for cooling. Alternatively, if the variation indicates the need for heating, the signal is fed to the $Q_3 - Q_5$ transistor buffer amplifier. The purpose of these amplifiers is to isolate the switching stages from the amplifier 40 output terminals. That is, the aforementioned buffing amplifers supply the necessary current to fire the successive stages of heating or cooling without loading the terminals 8 and 7 of the amplifier 40.

The switching action of the four-stage cooling side, is identical to the operation of the four-stage heating side. To energize the C1 relay, the potential at the emitter of $Q_6$ must be high enough to overcome the combined threshold voltage of the diode D2 in series with resistor R16 and the gate-to-cathode junction of SCR2. The threshold voltage for each diode or SCR junction is in this particular illustrative embodiment, 500 to 600 millivolts; therefore, the potential at the emitter of $Q_6$ necessary to turn SCR2 on i.e., to conduct, is approximately 1.0 volts.

When SCR2 fires (passes current), the lamp 12 in the anode circuit of SCR2 glows, lowering the resistance of the photoconductor 22 tied between terminal 23 of amplifier 40 and the gate of the triac TR2. When the photo-conductor 22 resistance drops to the predetermined value, triac TR2 begins to conduct and apply line voltage to the C1 relay. This voltage initiates the first cooling compressor. The potential across the relay C1 is rectified by rectifier diode RD2 and fed through the resistor R22 to the junction of capacitor C6 and the SCR2. This rectified potential supplies the hysteresis effect to accomplish positive turn-on and turn-off of the relay C1 by the control circuitry.

When the potential at the emitter of $Q_6$ falls sufficiently below the threshold voltage of the set-level of diode D2 and the gate-to-cathode junction of the SCR2, the SCR2 switches off positively. With no current, this shuts off the lamp 12 (that was illuminating the TR2 photo-conductor 22) thus, turning TR2 off.

And additional 0.5 volts (1.5 volts total) is required to turn on the second state of cooling, otherwise the second state is identical to the first in operation. One additional diode D4, to that of D2 is placed in series with the gate of the SCR of each successive stage for the increased voltage required to accomplish the stepping action of the control.

The control is designed to function with a d-c signal input, however, with changes in component values, the signal could be sine, square, or other complex wave shape. The d-c input can be from a + or − source and still effect proper circuit action. The logic of the circuit action must, however, be reversed, eg. cooling would be heating and vice-versa.

The set-level diode D2 should be of the higher leakage (100 nano amps) signal level type to insure the 0.45 to 0.5 threshold voltage in the forward direction. Lower leakage (10 nano ampere) types require 0.7 volts in the forward direction to cause conduction. This causes nonlinearity of total control performance if the fourth stage is required on heating or cooling.

With reference now to FIG. 4 in principle a triac (such as that of triac TR2 of FIG. 3) can be turned on if a low resistance is placed between the gate 3 and terminal 2. Consequently, if a high resistance photo-conductor is connected between the gate 3 and the terminal 2, when light strikes the photo-conductor, its resistance will be lowered and the triac switches on.

This can be readily done when the photo-conductor is kept in the dark and then exposed to a light source. In the preferred embodiment of the present invention, the light source 12 also has the function of service as a pilot light, that is, it is visible from outside the control box. In this respect, it is to be noted that the photo-conductor would "see" some room light through the glass envelope of the light source 12. However, since the controls will be used almost exclusively in rooms illuminated with fluorescent lights, a photo-conductor was chosen that is blind to fluorescent light and sensitive to incandescent light. Such a photo-conductor has a high resistance in the presence of fluorescent light and a low resistance when exposed to incandescent light. The graphical illustration of FIG. 5 is that of the photo-conductor response to a fluorescent light and non-response to an incandescent light. An incandescent pilot lamp was selected to operate at below rated voltage to result in a life-time in excess of 5 years.

With reference to FIG. 2, the power supply for the system of FIGS. 1 and 3 is shown in block together with the sensitivity circuit of the present invention. The power supply 41 is more or less commercial with the requirement that it be voltage regulated. Resistors R 42, R 44, R 50, R 46, and R 48 form the DC bridge shown schematically as bridge 10 in FIG. 1. The connection between R 42 and R 44 goes to pin 1 of the differential amplifier 40 (FIG. 2). The connection between R 46 and switch SW 1 of FIG. 3 goes to pin 6 of the differential amplifier 40 (FIG. 2). The sensitivity of the bridge is controlled by transistor 43 and resistors R 52, R 53, and R54. This method of sensitivity control comprises simply varying the DC potential across the bridge. It has been found that this method of sensitivity control does not affect the maximum output voltage differential of the differential amplifier 40.

The prior art technique would be to tie a rheostat connection between pin 10 and pin 8 of the differential amplifier (FIG. 2) to control sensitivity or gain of the amplifier. However, the standard technique limits the maximum swing of the control and causes nonlinear performance; namely, the heat-four and the cool-four stages shown in FIG. 1 would not increment on/off linearity.

The particular uniques and advantages of the invention above described are that (1) diodes set switching level of each state, (2) the hysteresis circuit, (3) there are no adjustments required in the manufacturing or installation of the controls, (4) high input impedance to signal, (5) circuits may be modified to use any wave shape as input signal, (6) high noise immunity, (7) low input voltage for each stage, (8) may be all solidstate, (9) switch in power supply as described in the aforementioned patent, a self-test switch which wne used in conjunction with the sensitivity and set point controls allows complete self check of the control, (10) sensitivity and set point controls are continuously variable in their respective ranges.

What is claimed is:

1. A system for controlling the air condition of a closed environment, a plurality of apparatus for restoring the air condition upon variation either above or below a predetermined condition;

a sensing circuit responsive to deviations above or below said predetermined condition;

at least two solidstate control circuits connected to said sensing circuit, means associated with each of said apparatus for providing a potential when a predetermined threshold level is exceeded, means also associated with each of said apparatus connected to a respective one of said threshold level means maintained quiescent in the absence of said potential and activated by said potential applied thereto; and triac switching means in turn activated by said last named means including a lamp and a photo conductor connected between said triac and said means for providing a potential, wherein current passing through said lamp causes the same to glow and thereby dropping the resistance of said photo conductor;

means for connecting said control circuits to respective apparatus for restoration of said air condition above or below said predetermined condition;

said apparatus responsive in sequence to the degree of variation above or below said predetermined condition thereby actuating in sequence one or more of said apparatus; and means for indicating which of said apparatus is being actuated.

2. A system as set forth in claim 1 wherein said control circuits further provide means for increasing said threshold potential level per succeeding restoration apparatus.

3. A system as set forth in claim 2 wherein said control circuit further comprises an SCR and a diode circuit, and wherein said threshold level is determined by the combined threshold voltage of said diode in conjunction with said SCR.

4. A system as set forth in claim 3 wherein said diode circuit further comprises an additional diode per succeeding restoration apparatus in series with said first diode to thereby proportionally increase said threshold potential level per succeeding restoration apparatus.

5. A system as set forth in claim 3 wherein said diode circuit further comprises a series resistor and a series connection to the gate-to-cathode junction of said SCR.

6. A system as set forth in claim 1 wherein said lamp further comprises said indicating means.

7. A system as set forth in claim 6 wherein said lamp is blind to fluorescent light.

8. A system as set forth in claim 6 where said electronic switching means further comprises a load and a rectifier for supplying the hystersis effect to accomplish positive turn-on and turn-off of said load.

9. A system as set forth in claim 1 wherein said sensing circuit further comprises buffer amplifiers for isolating said apparatus and to activate successive apparatus without loading.

* * * * *